(No Model.)

W. E. BANTA.
ELECTRIC WIRE COUPLING.

No. 441,919. Patented Dec. 2, 1890.

WITNESSES
H. M. Plaisted.
Warren Hull.

INVENTOR
William E. Banta,
By H. A. Toulmin
his Attorney.

UNITED STATES PATENT OFFICE.

WILLIAM EDGAR BANTA, OF SPRINGFIELD, OHIO.

ELECTRIC-WIRE COUPLING.

SPECIFICATION forming part of Letters Patent No. 441,919, dated December 2, 1890.

Application filed June 11, 1890. Serial No. 354,988. (No model.)

*To all whom it may concern:*

Be it known that I, WILLIAM EDGAR BANTA, a citizen of the United States, residing at Springfield, in the county of Clark and State of Ohio, have invented certain new and useful Improvements in Wire-Couplings, of which the following is a specification, reference being had therein to the accompanying drawings.

My invention relates to certain new and useful improvements in wire-couplings; and it consists, essentially, first, in a plurality or series of rings adapted to retain the full tensile strength of the metal composing them and bite the harder onto the jointing wires the greater the stress, and, secondly, in joining these rings in a suitable number to form a coupling without affecting their biting action.

Figure 1:
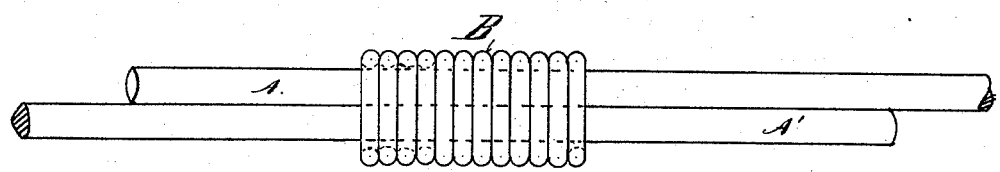
Figure 2:
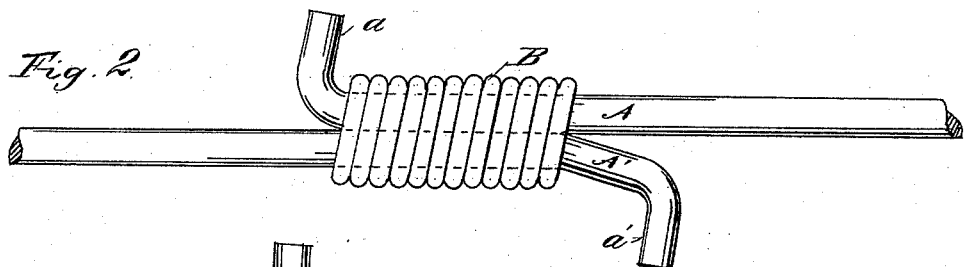
Figure 3:
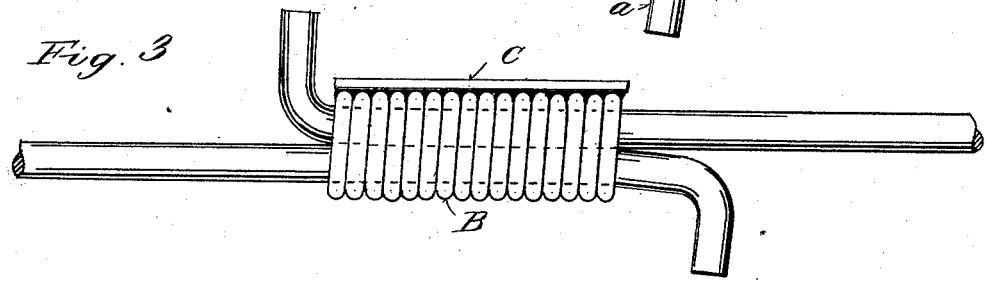

In the accompanying drawings, forming a part of this specification, and in which like reference-letters indicate corresponding parts, Figure 1 represents my device in the form of a series of rings and the line-wires in their first position; Fig. 2, the wires turned outward and the rings under stress; Fig. 3, the rings joined.

The letters A and A' designate the jointing ends of telegraph or line wire or any other kind of wire on which my device may be used.

The letter B designates a plurality of rings, which are shown in Fig. 1 as slipped over the said wires and hanging loosely thereon, whereby to form the coupling. The rings are of any convenient form—such as elliptical—and adapted to embrace said wires and allow of being easily slipped over the same.

In Fig. 2 the ends of the line-wires are shown bent outward, so that when drawn together the rings B will bite strongly onto the said wires and form the joint. The outer ends of the line-wire may be turned out at right angles, as at $a\ a'$; but in stiff wires a simple outward bend is all that is necessary to secure the coupling.

For convenience of handling my device, the rings may be joined by a bar or piece C, soldered, brazed, or otherwise secured to the rings at one end of each, as shown in Fig. 3. Thus a suitable number of rings to form a coupling are conveniently joined together to facilitate applying the coupling, while it does not interfere with the above-described action of the rings. It will be seen that since they are joined at one end only and the other end of each ring is free the stress on the line-wires bent outward will cause the said rings to slant sidewise and bite the wire, as before described. Any other method of joining the rings may be employed; but the principle of my device is a series of rings, either joined or separate, which can be easily applied to fit line-wire of suitable sizes.

Another advantage of my device is that being simple it can be applied by cheaper labor than that used in applying the ordinary britannia joint; also, the coupling may be removed and used again by simply straightening the bent ends of the joining line-wires and removing my device therefrom. There is no necessity of soldering the joining line-wires together to secure complete electrical connection, since the stronger the stress on the said line-wires the harder will they be drawn together by the action of the coupling. Moreover, when the line-wires become slack, it is an easy matter to take up the slackness by slipping the joining ends farther past each other through the coupling and bending them outward again.

It will be observed that my device takes advantage of the tensile strength of the material of which the rings are composed, and is thus of greater value than the coupling on which the strain is exerted otherwise than in the direction best adapted to resist said stress, as in the case of a tube where the joining line-wires tend to split the tube.

While my device is especially adapted to form a coupling for electric wires, it may be used for other purposes.

Having thus fully described my invention, what I claim as new, and desire to secure by Letters Patent, is—

1. In a wire-coupling, the combination, with the joining ends of line-wires, of a plurality of rings embracing them and each adapted to bite onto said wires as it assumes an oblique position under the suspension strains of the coupled wires.

2. In a wire-coupling, the combination, with the joining ends of line-wires bent outward, of a coupling composed of rings joined together and each adapted to grip the said line-wires strongly when the ends of said line-wires are pulled in opposite directions.

3. As an improved article of manufacture, an electric-wire coupling consisting of a plurality of rings secured together by a longitudinal piece or bar.

4. As an improved article of manufacture, an electric-wire coupling consisting of a plurality of rings and a piece or bar secured thereto in a longitudinal direction, whereby the rings are connected one with the other along a line, but are otherwise disconnected from each other along their edges.

In testimony whereof I affix my signature in presence of two witnesses.

WILLIAM EDGAR BANTA.

Witnesses:
OLIVER H. MILLER,
WARREN HULL.